US012062852B2

(12) United States Patent
Yang et al.

(10) Patent No.: US 12,062,852 B2
(45) Date of Patent: Aug. 13, 2024

(54) ANTENNA AND FABRICATION METHOD

(71) Applicant: Chengdu Tianma Micro-Electronics Co., Ltd., Chengdu (CN)

(72) Inventors: Zuocai Yang, Chengdu (CN); Qinyi Duan, Chengdu (CN); Ning He, Chengdu (CN); Yunhua Liu, Chengdu (CN); Kerui Xi, Xiamen (CN); Zhenyu Jia, Xiamen (CN); Donghua Wang, Chengdu (CN); Yingru Hu, Chengdu (CN)

(73) Assignee: Chengdu Tianma Micro-Electronics Co., Ltd., Chengdu (CN)

( * ) Notice: Subject to any disclaimer, the term of this patent is extended or adjusted under 35 U.S.C. 154(b) by 166 days.

(21) Appl. No.: 17/946,974

(22) Filed: Sep. 16, 2022

(65) Prior Publication Data

US 2023/0411867 A1 Dec. 21, 2023

(30) Foreign Application Priority Data

Jun. 21, 2022 (CN) ......................... 202210706975.0

(51) Int. Cl.

| | |
|---|---|
| ***H01Q 1/38*** | (2006.01) |
| ***H01Q 1/48*** | (2006.01) |
| ***H01Q 21/00*** | (2006.01) |
| ***H01Q 21/06*** | (2006.01) |

(52) U.S. Cl.

CPC ............. *H01Q 21/061* (2013.01); *H01Q 1/48* (2013.01); *H01Q 21/0087* (2013.01)

(58) Field of Classification Search

CPC .. H01Q 1/12; H01Q 1/38; H01Q 1/48; H01Q 1/50; H01Q 1/52; H01Q 1/521; H01Q 21/00; H01Q 21/0006; H01Q 21/0087; H01Q 21/06; H01Q 21/061; H01Q 3/44

See application file for complete search history.

(56) References Cited

U.S. PATENT DOCUMENTS 5,771,025 A * 6/1998 Reece ...................... H01Q 9/28 343/846
6,359,590 B2 * 3/2002 Takenoshita ....... H01Q 21/0068 343/785

(Continued)

FOREIGN PATENT DOCUMENTS

CN 101335374 A 12/2008
CN 113594669 A 11/2021

*Primary Examiner* — Tho G Phan

(74) *Attorney, Agent, or Firm* — Anova Law Group, PLLC

(57) ABSTRACT

An antenna and a fabrication method of the antenna are provided. The antenna includes a plurality of sub-antennas arranged in an array. A sub-antenna of the plurality of sub-antennas includes a first substrate and a second substrate that are disposed opposite to each other, a dielectric function layer disposed between the first substrate and the second substrate, a ground metal layer disposed on a side of the first substrate facing towards the dielectric function layer, and a metal connector. The first substrate of each sub-antenna is coplanar with each other, and the second substrate of each sub-antenna is coplanar with each other. A spliced region is formed between adjacent two sub-antennas of the plurality of sub-antennas, and in the spliced region, two first substrates of the adjacent two sub-antennas are connected by the metal connector.

20 Claims, 6 Drawing Sheets

(56) References Cited

U.S. PATENT DOCUMENTS

| | | | | |
|---|---|---|---|---|
| 8,674,882 | B2 * | 3/2014 | Huang | H01Q 1/36<br>343/836 |
| 10,374,671 | B2 * | 8/2019 | Jan | H01Q 19/10 |
| 11,056,754 | B2 * | 7/2021 | Mai | H01Q 1/38 |
| 11,652,282 | B2 * | 5/2023 | Yang | H01Q 3/44<br>343/846 |
| 11,705,643 | B2 * | 7/2023 | Xi | H01Q 3/36<br>343/702 |
| 2023/0361484 | A1 * | 11/2023 | Komura | H01Q 9/0428 |

* cited by examiner

ANTENNA AND FABRICATION METHOD

CROSS-REFERENCE TO RELATED APPLICATION

This application claims the priority of Chinese patent application No. 202210706975.0, filed on Jun. 21, 2022, the entirety of which is incorporated herein by reference.

FIELD

The present disclosure generally relates to the field of communication technology and, more particularly, relates to an antenna and a fabrication method of an antenna.

BACKGROUND

Liquid crystal antenna is a new type of array antenna based on liquid crystal phase shifters. Liquid crystal antenna has a wide range of application prospects in satellite receiving antenna, vehicle radar, 5G base station antenna and any other field.

To realize a large-area coverage of liquid crystal antenna and facilitate the maintenance and portability of a single group, single small liquid crystal antenna boxes are often used to be spliced to realize a large-area antenna. However, the existing large-area liquid crystal antenna formed by splicing often has a technical problem that the radiation gain cannot reach an expected level.

Therefore, how to improve the radiation gain of the spliced antenna is an urgent technical problem that needs to be solved.

SUMMARY

One aspect of the present disclosure provides an antenna. The antenna includes a plurality of sub-antennas arranged in an array. A sub-antenna of the plurality of sub-antennas includes a first substrate and a second substrate that are disposed opposite to each other, a dielectric function layer disposed between the first substrate and the second substrate, a ground metal layer disposed on a side of the first substrate facing towards the dielectric function layer, and a metal connector. The first substrate of each sub-antenna is coplanar with each other, and the second substrate of each sub-antenna is coplanar with each other. A spliced region is formed between adjacent two sub-antennas of the plurality of sub-antennas, and in the spliced region, two first substrates of the adjacent two sub-antennas are connected by the metal connector.

Another aspect of the present disclosure provides a fabrication method of an antenna. The method includes providing a plurality of sub-antennas. A sub-antenna of the plurality of sub-antennas includes a first substrate and a second substrate that are disposed opposite to each other, a dielectric function layer disposed between the first substrate and the second substrate, and a ground metal layer disposed on a side of the first substrate facing towards the dielectric function layer. The method also includes arranging the plurality of sub-antennas in an array. The first substrate of each sub-antenna is coplanar with each other, and the second substrate of each sub-antenna is coplanar with each other. Further, the method includes disposing a metal connector in a spliced region of adjacent two sub-antennas of the plurality of sub-antennas. The metal connector connects first substrates of the adjacent two sub-antennas.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

The spliced antenna may have an overall structure formed by individually manufacturing single antennas and splicing multiple antennas by bolts or any other method, to increase the scale of the antenna array, thereby improving the radiation gain of the antenna.

When a plurality of sub-antennas are used to form an antenna with a substantially large area, a gap may be formed between adjacent two sub-antennas (e.g., between ground metal layers of the adjacent two sub-antennas), and the adjacent two sub-antennas may often be bonded with glue at the gap position, to fix the adjacent two sub-antennas. However, the leakage of microwaves cannot be avoided at the gap bonded with glue, and the leakage of microwaves may inevitably reduce the radiation gain of the antenna to a certain extent and may affect the radiation gain of the antenna.

The present disclosure provides an antenna. The antenna may include a plurality of sub-antennas arranged in an array. A sub-antenna may include a first substrate and a second substrate that are disposed opposite to each other, and a dielectric function layer disposed between the first substrate and the second substrate. A ground metal layer may be disposed on a side of the first substrate facing towards the dielectric function layer. The first substrate of each sub-antenna may be coplanar with each other, and the second substrate of each sub-antenna may be coplanar with each other. The sub-antenna may further include a metal connector. A spliced region may be formed between adjacent two sub-antennas. In the spliced region, the first substrates of the adjacent two sub-antennas may be connected by the metal connector. Through disposing the metal connector in the spliced region, leakage of microwaves in the spliced region may be prevented or reduced, which may facilitate to prevent or reduce signal attenuation caused by microwave leakage, and to improve the stability of microwave signal and the radiation performance of the antenna.

Figure 1:
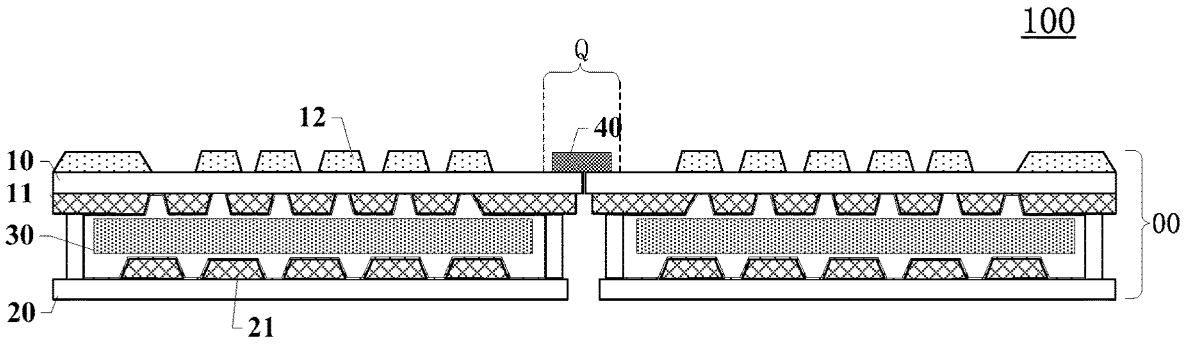
FIG. 1 illustrates a schematic diagram of an exemplary antenna consistent with disclosed embodiments of the present disclosure.

FIG. 1 illustrates a schematic diagram of an antenna consistent with various disclosed embodiments of the present disclosure. Referring to FIG. 1, an antenna 100 may include a plurality of sub-antennas 00 arranged in an array. A sub-antenna 00 may include a first substrate 10, a second substrate 20, and a dielectric function layer 30 disposed between the first substrate 10 and the second substrate 20. A ground metal layer 11 may be disposed on a side of the first substrate 10 facing towards the dielectric function layer 30.

The first substrate 10 of each sub-antenna 00 may be coplanar with each other, and the second substrate 20 of each sub-antenna 00 may be coplanar with each other. The sub-antenna 00 may further include a metal connector 40. A spliced region Q may be located between adjacent two sub-antennas 00. In the spliced region Q, the first substrates 10 of the adjacent two sub-antennas 00 may be connected by the metal connector 40.

In one embodiment, the antenna may further include a phase shifter 21 disposed on a side of the second substrate 20 facing towards the dielectric function layer 30. The dielectric function layer 30 disposed between the first substrate 10 and the second substrate 20 may include a function layer that is capable of changing the dielectric constant, such as a liquid crystal layer, or a photo-dielectric change layer, etc. When the dielectric function layer 30 is a liquid crystal layer, the phase shifter 21 may not only transmit a high-frequency signal introduced onto the antenna, but also may apply a bias voltage to generate an electric field in cooperation with the ground metal layer 11, which may drive the liquid crystal molecules in the liquid crystal layer to deflect, such that the phase of the high-frequency signal transmitted onto the phase shifter 21 may be changed through the deflection of the liquid crystal molecules, thereby realizing the phase-shifting function of the high-frequency signal.

When the dielectric function layer 30 is a photo-dielectric change layer, the phase shifter 21 may merely transmit the high-frequency signal introduced onto the antenna. For example, the dielectric constant of the photo-dielectric change layer may be changed by controlling the light intensity, or by controlling the wavelength, which may not be limited by the present disclosure, as long as the dielectric constant of the photo-dielectric change layer is capable of being changed. The change of the dielectric constant of the photo-dielectric change layer may shift the phase of the high-frequency signal transmitted onto the phase shifter, such that the phase of the high-frequency signal may be changed, to achieve the phase-shifting function of the high-frequency signal. For example, when the dielectric function layer 30 is a photo-dielectric change layer, the photo-dielectric change layer may be made of a material including azo fuel or azo polymer.

In one embodiment, a radiator 12 may be disposed on a side of the first substrate facing away from the dielectric function layer 30. After the phase of the high-frequency signal transmitted onto the phase shifter 21 changes, the high-frequency signal may be ultimately coupled to the radiator 12, and the high-frequency signal may be radiated to the outside through the radiator 12. In one embodiment, the antenna may include a plurality of radiators, the plurality of radiators 12 may be independent of each other, and each radiator 12 may radiate signals outside.

Although FIG. 1 merely illustrates two sub-antennas 00 that are spliced, the quantity of sub-antennas 00 included in the antenna may not be limited in the present disclosure. In other words, the quantity of sub-antennas 00 included in the antenna may be flexibly determined according to practical applications, for example, the sub-antennas 00 may be arranged in an N×N array, where N≥2.

In one embodiment, the antenna in the present disclosure may include the plurality of sub-antennas 00 arranged in an array. The first substrates 10 of the plurality of sub-antennas 00 may be coplanar with each other, and the second substrates 20 of the plurality of sub-antennas 00 may be coplanar with each other. In other words, the first substrates 10 of the plurality of sub-antennas 00 may be flush with each other, and the second substrates 20 of the plurality of sub-antennas 00 may be flush with each other. The plurality of sub-antennas 00 may be spliced to form the antenna with a substantially large area.

The spliced region Q may be located between the adjacent two sub-antennas 00. The spliced region Q may include a gap between the adjacent two sub-antennas 00 and at least a portion of the regions on both sides of the gap. In the spliced region Q, the first substrates 10 of the adjacent two sub-antennas 00 may be connected by the metal connector 40. In other words, the metal connector 40 may be introduced in the spliced region Q. The metal connector 40 may have a signal shielding function, and the metal connector 40 may be simultaneously connected with the first substrates 10 of the adjacent two sub-antennas 00. Therefore, the metal connector may reduce the leakage of microwaves at the gap between the adjacent two sub-antennas 00 to a certain extent, thereby facilitating to prevent or reduce signal attenuation caused by microwave leakage, and to improve the stability of microwave signal and the radiation performance of the antenna.

Figure 2:
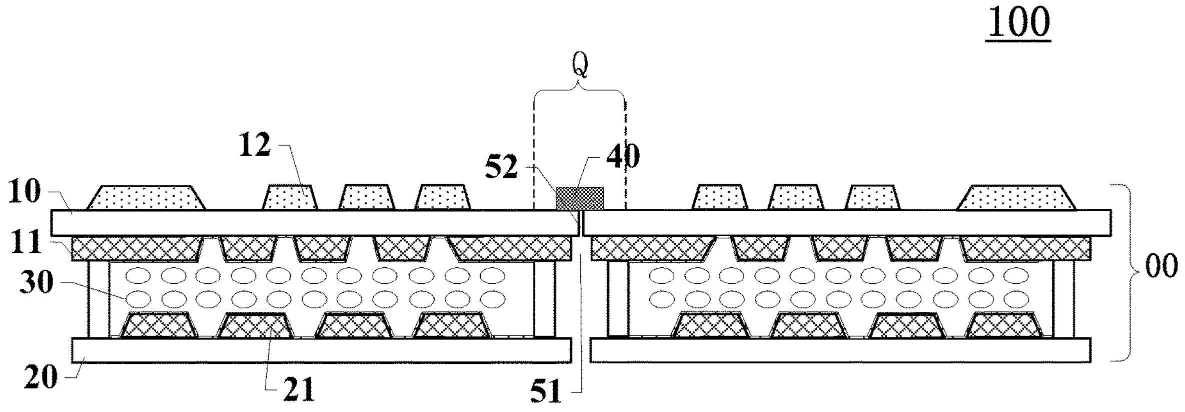
FIG. 2 illustrates a schematic diagram of another exemplary antenna consistent with disclosed embodiments of the present disclosure.

FIG. 2 illustrates a schematic diagram of another antenna consistent with disclosed embodiments of the present disclosure, which may focus on a relative positional relationship between the first gap 51 and the metal connector 40 of the adjacent two sub-antennas 00. Referring to FIG. 2, in one embodiment, in the spliced region Q, the first gap 51 may be formed between the ground metal layers 11 of the adjacent two sub-antennas 00. Along a direction perpendicular to the first substrate 10, the metal connector 40 may cover the first gap 51.

In one embodiment, in the disclosed antenna, when the metal connector 40 is disposed in the spliced region Q to connect the first substrates 10 of the adjacent two sub-antennas 00, the corresponding relationship between the metal connector 40 and the first gap 51 between the corresponding ground metal layers 11 of the adjacent two sub-antennas 00 may include that an orthographic projection of the metal connector 40 on the plane of the first substrate 10 may cover an orthographic projection of the first gap 51 between the ground metal layers 11 of the adjacent two sub-antennas 00 on the plane of the first substrate 10. In other words, the first gap 51 may be covered by the metal connector 40, which may effectively block the path of microwave leakage, may facilitate to prevent or reduce signal attenuation caused by microwave leakage, to improve the stability of the microwave signal and the radiation performance of the antenna.

Figure 3:
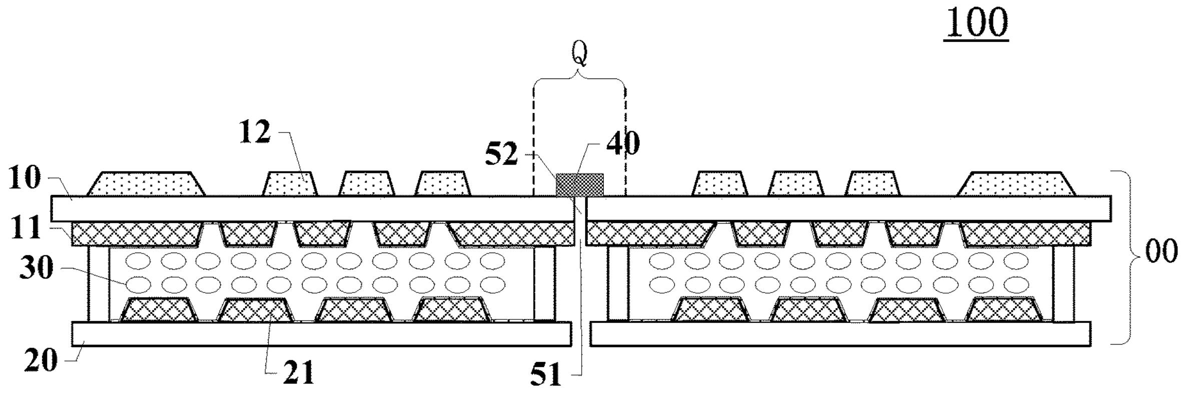
FIG. 3 illustrates a schematic diagram of another exemplary antenna consistent with disclosed embodiments of the present disclosure.

It should be understood that when the adjacent two sub-antennas 00 are spliced together, a second gap 52 may be formed between adjacent two first substrates 10. FIG. 3 illustrates a schematic diagram of another antenna consistent with disclosed embodiments of the present disclosure. In one embodiment, referring to FIG. 3, an orthographic projection of the second gap 52 on the plane of the first substrate 10 may overlap with the orthographic projection of the first gap 51 on the plane of the first substrate 10. In another embodiment, referring to FIG. 2, the orthographic projection of the second gap 52 on the plane of the first substrate 10 may be located within the orthographic projection of the first gap 51 on the plane of the first substrate 10. In one embodiment, the orthographic projection of the metal connector 40 on the plane of the first substrate 10 may not only cover the orthographic projection of the first gap 51 on the plane of the first substrate 10, but also cover the orthographic projection of the second gap 52 on the plane of the first substrate 10. In view of this, the metal connector 40 may effectively block the path of microwave leakage, which may facilitate to improve the radiation performance of the antenna.

Figure 4:
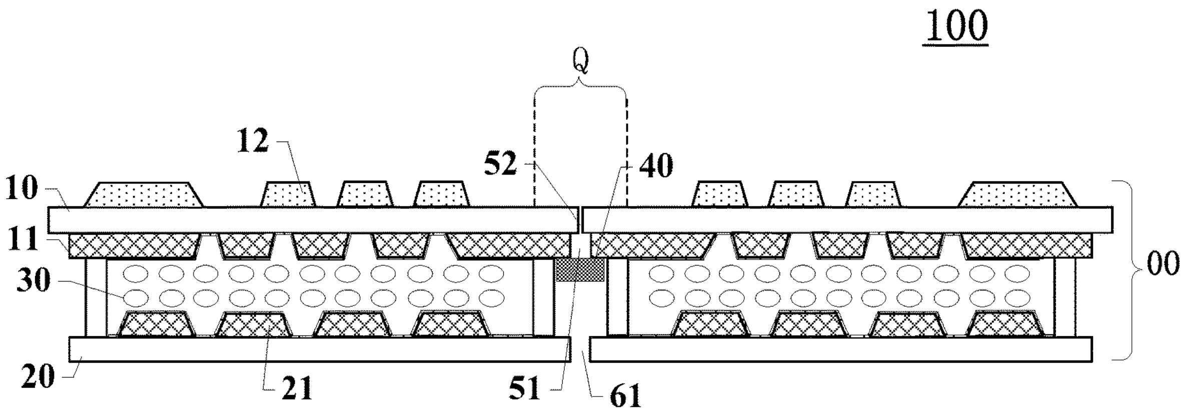
FIG. 4 illustrates a schematic diagram of another exemplary antenna consistent with disclosed embodiments of the present disclosure.
Figure 5:
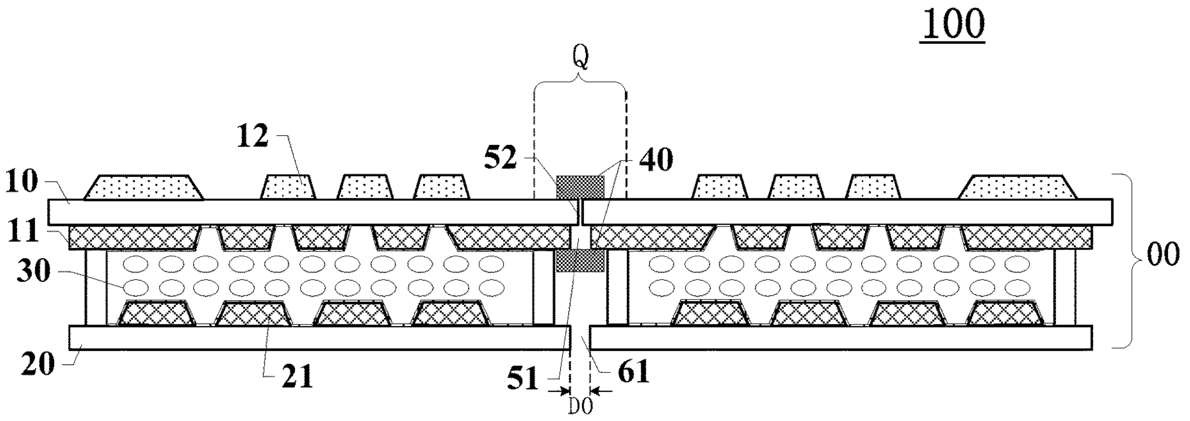
FIG. 5 illustrates a schematic diagram of another exemplary antenna consistent with disclosed embodiments of the present disclosure.

FIG. 4 illustrates a schematic diagram of another antenna consistent with disclosed embodiments of the present disclosure, and FIG. 5 illustrates a schematic diagram of another antenna consistent with disclosed embodiments of the present disclosure. The difference between the antenna in embodiments associated with FIG. 4 and FIG. 5 and the antenna in embodiments associated with FIGS. 1-3 may include that the relative positional relationship between the metal connector 40 and the first substrates 10 may be different. In the embodiments associated with FIGS. 1-3, the metal connector 40 may be located above the first substrate 10, in other words, the metal connector 40 may be located on a surface of the first substrate 10 away from the dielectric function layer 30. In the embodiment associated with FIG. 4, the metal connector 40 may be located below the first substrate 10, in other words, the metal connector 40 may be located on a surface of the first substrate facing towards the dielectric function layer 30. In the embodiment associated with FIG. 5, metal connectors 40 may be located above and below the first substrate 10.

Referring to FIGS. 1-5, in one embodiment, the metal connector 40 may be located on the surface of the first substrate 10 facing away from the dielectric function layer 30, and/or the metal connector 40 may be located on the surface of the first substrate 10 facing towards the dielectric function layer 30.

In one embodiment, in the disclosed antenna, when the metal connector 40 is disposed in the spliced region Q, referring to FIGS. 1-3, the metal connector 40 may be located on the surfaces of the adjacent two first substrates 10 away from the dielectric function layer 30. When the microwave of the sub-antenna 00 is transmitted, the microwave may be blocked by the metal connector 40 above the first substrate 10 in the spliced region Q, which may facilitate to reduce the amount of leakage of microwaves and to reduce the signal attenuation caused by microwave leakage. Moreover, by disposing the metal connector 40 on the surface of the first substrate 10 facing away from the dielectric function layer 30, the process of manufacturing the metal connector 40 may be substantially simple.

Referring to FIG. 4, when the metal connector 40 is disposed under the first substrate 10, in other words, when the metal connector 40 is disposed over the surface of the first substrate 10 facing towards the dielectric function layer 30, the metal connector 40 may form a signal shielding barrier on a side where the ground metal layer 11 is located, which may reduce or avoid the phenomenon that the microwave signal enters the first gap 51 between the adjacent ground metal layers 11 and is further diffused from the first gap 51. Therefore, the metal connector 40 may be disposed under the first substrate 10, which may substantially facilitate to prevent the leakage of microwave signal, and may facilitate to improve the radiation performance of the antenna.

Referring to FIG. 5, in one embodiment, in the spliced region Q, metal connectors 40 may be disposed on the side of the first substrate 10 facing away from the dielectric function layer 30 and over the side of the first substrate 10 facing towards the dielectric function layer 30. When at least a portion of the microwave signal generated by the antenna is transmitted to the metal connector 40 disposed on the side of the first substrate 10 facing towards the dielectric function layer 30, the metal connector 40 may shield the microwave signal. Even if a portion of the microwave signal is further transmitted to the outside from the second gap 52 between the first substrates 10, the metal connector 40 disposed on the side of the first substrate facing away from the dielectric function layer 30 may further shield such portion of the microwave signal. The metal connectors 40 disposed on both sides of the first substrate 10 may form two signal shielding barriers, which may substantially facilitate to prevent the leakage of microwaves and avoid signal attenuation caused by microwave leakage, thereby improving the overall radiation gain of the spliced antenna.

Referring to FIG. 4 and FIG. 5, in one embodiment, the metal connector 40 may be located on the surface of the first substrate 10 facing towards the dielectric function layer and the metal connector 40 may be respectively connected to ground metal layers 11 corresponding to the adjacent two first substrates 10.

In one embodiment, because the ground metal layer 11 is disposed on the surface of the first substrate 10 facing towards the dielectric function layer 30, when the metal connector is disposed on the surface of the first substrate 10 facing towards the dielectric function layer the metal connector 40 may be in contact with the ground metal layers 11 corresponding to the adjacent two sub-antennas 00, respectively. Therefore, the metal connector 40 and the ground metal layer 11 may have a same potential, and the metal connector 40 may be configured to shield the first gap 51 between the ground metal layers 11 corresponding to the adjacent two sub-antennas 00. At the same time, the metal connector 40 and the ground metal layers 11 connected thereto may form a shielding layer with a substantially large area, which may facilitate to prevent the microwave signal from being leaked from the gap between the ground metal layers 11 and the metal connector 40, may facilitate to realize the shielding of the microwave signal, and may avoid the leakage of the microwave signal.

Referring to FIG. 4 and FIG. 5, in one embodiment, a first interval 61 may be formed between the second substrates 20 of the adjacent two sub-antennas 00.

In one embodiment, when a plurality of sub-antennas 00 are spliced to form an antenna with a substantially large area, the metal connector 40 may be disposed on the surface of the first substrate facing away from the dielectric function layer 30 and/or on the surface of the first substrate 10 facing towards the dielectric function layer 30, to reduce or avoid the signal attenuation due to leakage of microwave signal. In the disclosed embodiments, the first interval 61 may be formed between the second substrates 20 corresponding to the adjacent two sub-antennas 00. In other words, the second substrates 20 corresponding to the adjacent two sub-antennas 00 may not be in contact with each other. In view of this, when the metal connector 40 needs to be disposed on the side of the first substrate 10 facing towards the dielectric function layer 30, the metal connector 40 may be formed through the first interval 61 between the second substrates 20, to simplify the difficulty of forming the metal connector 40 on the side of the first substrate 10 facing towards the dielectric function layer 30.

Referring to FIG. 5, in one embodiment, a width DO of the first interval 61 may be in a range of approximately 0.1 mm-1 mm. In one embodiment, when the metal connector 40 is disposed on the side of the first substrate 10 facing towards the dielectric function layer 30, the metal connector 40 may include a metal foil. When the width of the first interval 61 is in a range of approximately 0.1 mm-1 mm, the metal foil may be put onto the side of the first substrate 10 facing towards the dielectric function layer 30 through the first interval 61 by an auxiliary tool, to achieve the connection between the metal connector 40 and first substrates 10 corresponding to the adjacent two sub-antennas 00, or to achieve the connection between the metal connector 40 and the ground metal layers 11 of the adjacent two sub-antennas 00.

In another embodiment, the metal connector 40 may be formed by curing a metal paste. In the actual manufacturing process, the metal paste may be injected into the side of the first substrate 10 facing towards the dielectric function layer 30 through the first interval 61 by an auxiliary tool (such as a needle). In view of this, a width of the first interval 61 may merely need to ensure that the auxiliary tool is capable of passing through the first interval. For example, the width D0 of the first interval 61 may be in a range of approximately 0.1 mm-0.5 mm.

If the width of the first interval 61 is set to be substantially small, for example, if the width of the first interval 61 is less than 0.1 mm, the process difficulty of forming or fixing the metal connector 40 on the side of the first substrate 10 facing towards the dielectric function layer 30 through the first interval 61 may increase. Therefore, through configuring the width of the first interval 61 to be greater than or equal to 0.1 mm, the process difficulty of forming or fixing the metal connector 40 on the side of the first substrate 10 facing towards the dielectric function layer 30 through the first interval 61 may be reduced to a certain extent, thereby simplifying the production process. If the width of the first interval 61 is set to be substantially large, for example, if the width of the first interval 61 is greater than 1 mm, the first gap 51 between the ground metal layers 11 corresponding to the adjacent two sub-antennas 00 may be too large, which may cause the second gap 52 between the first substrates 10 corresponding to the adjacent two sub-antennas 00 to be too large. The substantially large first gap 51 and the second gap 52 may not facilitate the shielding of the microwave signal. Therefore, the width of the first interval 61 may be set within 1 mm, which may facilitate the shielding of microwave signal on the side of the first substrate 10.

Figure 6:
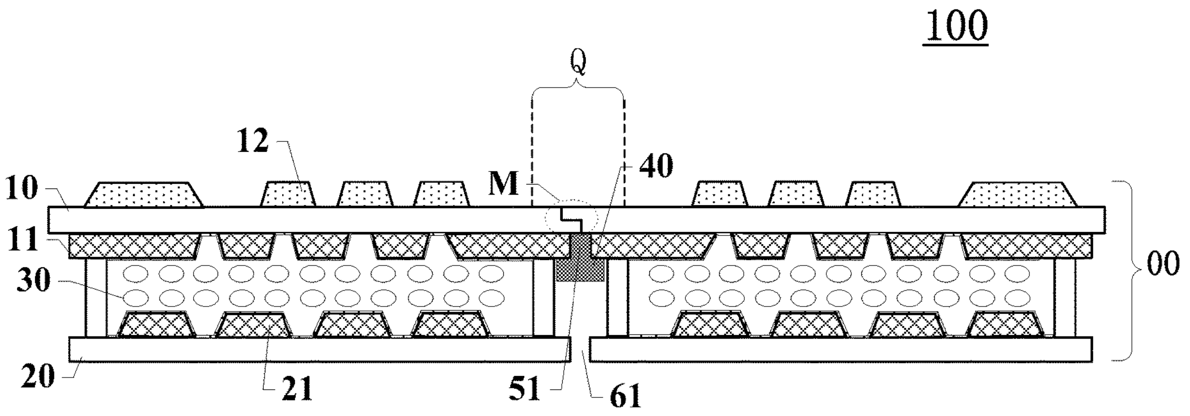
FIG. 6 illustrates a schematic diagram of another exemplary antenna consistent with disclosed embodiments of the present disclosure.

FIG. 6 illustrates a schematic diagram of another antenna consistent with disclosed embodiments of the present disclosure, which illustrates a relative positional relationship between the adjacent two first substrates 10.

Referring to FIG. 6, in one embodiment, in the spliced region Q, each of the two first substrates 10 corresponding to the adjacent two sub-antennas 00 may include an irregularly shaped surface M, and the two irregularly shaped surfaces M of the two first substrates 10 may be nested.

In the disclosed embodiments, in the first substrates 10 corresponding to adjacent two sub-antennas 00, the two surfaces of the two first substrates 10 that are opposite to each other along an arrangement direction of the two sub-antennas 00 may be the irregularly shaped surfaces M, respectively, and the two irregularly shaped surfaces M may be nested. The adjacent two first substrates 10 may be nested through the irregularly shaped surfaces M, which may facilitate to improve the splicing reliability of the first substrates 10 corresponding to the adjacent two sub-antennas 00, and thus may facilitate to increase the overall splicing reliability of the adjacent two sub-antennas 00.

Referring to FIG. 6, in the disclosed embodiments, in the two first substrates 10 corresponding to adjacent two sub-antennas 00, both the two irregularly shaped surfaces M may be L-shaped.

In the disclosed embodiments, both the corresponding irregularly shaped surfaces M of the first substrates 10 of the adjacent two sub-antennas 00 may include an L-shape. When forming the first substrate 10, a substrate with a regular shape may often be cut to form the irregularly shaped surface M. When the irregularly shaped surface M includes an L-shape, the structure may be substantially simple and may be formed by simple cutting, which may facilitate to simplify the manufacturing process of the antenna, and to improve the production efficiency.

Figure 7:
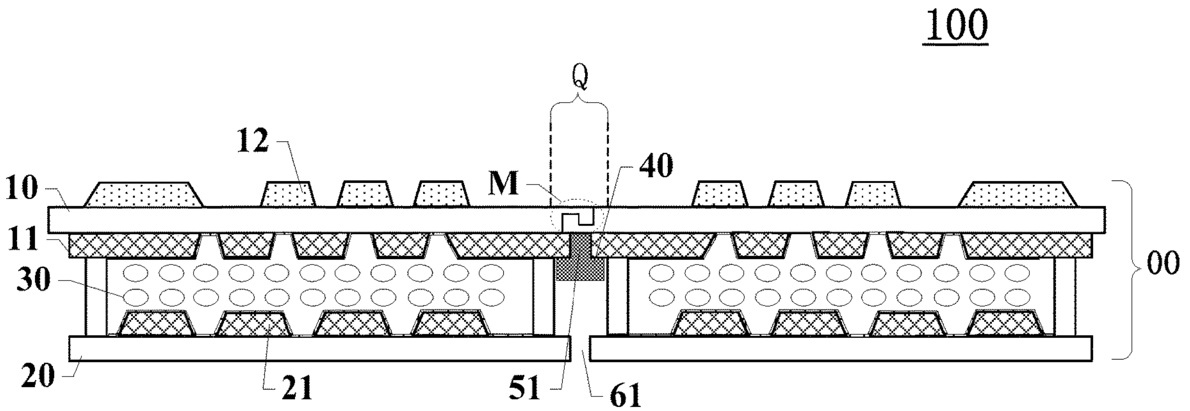
FIG. 7 illustrates a schematic diagram of another exemplary antenna consistent with disclosed embodiments of the present disclosure.

In certain embodiments, the irregularly shaped surfaces M corresponding to the adjacent two first substrates 10 may have any other shape, such as a shape of a character "己" illustrated in FIG. 7. FIG. 7 illustrates a schematic diagram of another antenna consistent with disclosed embodiments of the present disclosure.

Figure 8:
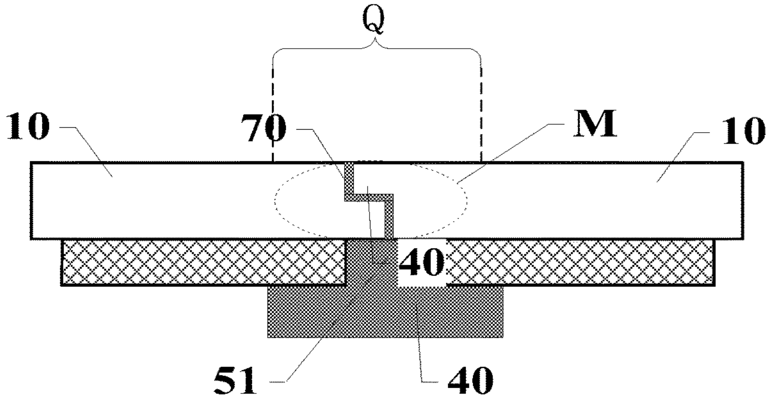
FIG. 8 illustrates a schematic diagram showing a relative positional relationship between first substrates, ground metal layers, and metal connectors of adjacent two sub-antennas in an exemplary antenna consistent with disclosed embodiments of the present disclosure.

FIG. 8 illustrates a schematic diagram showing a relative positional relationship between the first substrates 10, the ground metal layers 11, and the metal connectors 10 of adjacent two sub-antennas 00 in an antenna consistent with disclosed embodiments of the present disclosure. In the disclosed embodiments, a metal layer 70 may be formed between the irregularly shaped surfaces M of adjacent two first substrates 10.

Referring to FIG. 8, in one embodiment, the metal layer 70 may be disposed between the two irregularly shaped surfaces M, and the metal layer 70 may be electrically connected to the metal connector 40.

In one embodiment, when adjacent two first substrates 10 are spliced by using two irregularly shaped surfaces M, the metal layer 70 may be disposed in the region between the two irregularly shaped surfaces M, which may be equivalent to disposing the metal layer 70 between the two irregularly shaped surfaces M. Further, the above-disclosed metal layer 70 may be electrically connected to the metal connector 40, such that the metal layer 70 and the metal connector 40 may have the same potential. In view of this, when a portion of the microwave is transmitted to the gap between the two irregularly shaped surfaces M, the metal layer 70 disposed in the gap between the two irregularly shaped surfaces M may shield the microwaves and may suppress further leakage of the microwaves.

Referring to FIG. 8, the metal connector 40 may be disposed on the side of the first substrate 10 facing towards the dielectric function layer 30, and at the same time, the metal layer 70 may be disposed between the irregularly shaped surfaces M of adjacent two first substrates 10. In certain embodiments, when the metal connector 40 is disposed on the side of the first substrate 10 facing away from the dielectric function layer 30, the metal layer 70 may be disposed between the irregularly shaped surfaces M of adjacent two first substrates 10.

Figure 9:
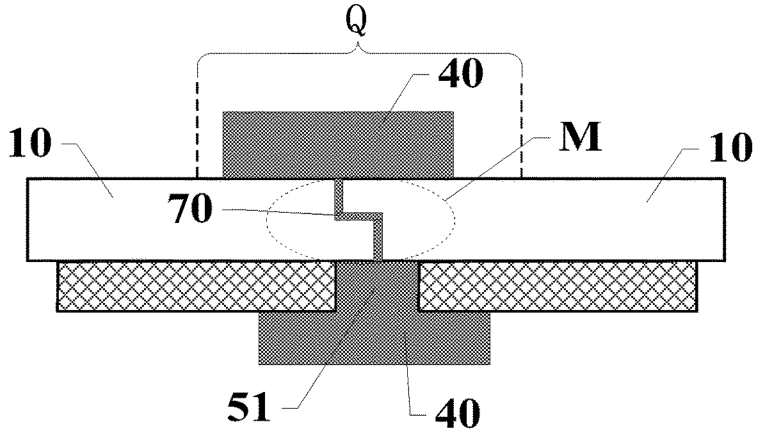
FIG. 9 illustrates a schematic diagram showing a relative positional relationship between first substrates, ground metal layers, and metal connectors of adjacent two sub-antennas in another exemplary antenna consistent with disclosed embodiments of the present disclosure.

FIG. 9 illustrates a schematic diagram showing a relative positional relationship between the first substrates 10, the ground metal layers 11, and the metal connectors 40 of the adjacent two sub-antennas in another antenna consistent with disclosed embodiments of the present disclosure. In certain embodiments, referring to FIG. 9, when the metal connectors 40 are disposed on both the side of the first substrate 10 facing away from the dielectric function layer 30 and the side of the first substrate 10 facing towards the dielectric function layer 30, the metal layer 70 may be disposed between the irregularly shaped surfaces M of adjacent two first substrates 10. The metal layer 70 may be electrically connected to the metal connectors 40 disposed on the upper and lower sides of the metal layer 70, respectively, such that the metal layer 70 and the two metal connectors 40 may together form a microwave shielding barrier, which may further facilitate to avoid the leakage of microwaves and to improve the radiation performance of the antenna.

It should be noted that the metal layer 70 disposed in the gap between the irregularly shaped surfaces M of adjacent two first substrates 10 may be fixed to the irregularly shaped surfaces M by sticking.

In one embodiment, the metal connector 40 may be formed by curing a metal paste, or the metal connector 40 may include a metal foil.

In one embodiment, when the metal connector 40 is formed by curing the metal paste, after the sub-antennas 00 are spliced, the metal paste may be injected into the spliced region Q corresponding to the adjacent two first substrates 10 to form the metal connector 40. When the metal connector is made of the metal paste, the metal paste may be capable of filling the first gap 51 between the ground metal layers 11 of the adjacent two sub-antennas 00, as illustrated in FIGS. 7-9, which may facilitate to reduce the transmission path of the microwave signal, and may facilitate to avoid or reduce the signal attenuation caused by microwave leakage. When the metal connector 40 is a metal foil, the metal foil may be pasted on the spliced region Q corresponding to the adjacent two first substrates 10 by pasting. The metal connector 40 formed by curing the metal paste or the metal connector 40 formed by the metal foil may shield microwaves, which may facilitate to reduce or avoid the possibility of microwave leakage.

In one embodiment, the metal connector 40 may be made of a material including at least one of silver, copper, aluminum and gold.

Silver, copper, aluminum and gold may have desired electrical conductivity and shielding performance. In the disclosed embodiments, when the metal connector 40 is made of a material selected from at least one of silver, copper, aluminum and gold, the metal connector 40 may not only form a desired electrical contact with the ground metal layer 11, but also form a desired electrical signal shielding structure, which may effectively reduce the leakage of microwaves and improve the radiation performance of the large-area antenna.

Referring to FIG. 8 or FIG. 9, in one embodiment, along a direction perpendicular to the first substrate 10, a thickness of the metal connector 40 may be greater than or equal to a thickness of the ground metal layer 11.

It should be understood that the greater the thickness of the metal connector 40, the better the shielding effect on microwave signal. When the thickness of the metal connector 40 is greater than or equal to the thickness of the ground metal layer 11, on the one hand, the microwave signal may be effectively shielded, and on the other hand, the first substrate 10 and the second substrate 20 may be effectively fixed, thereby improving the fixing reliability between the adjacent two sub-antennas 00.

Figure 10:
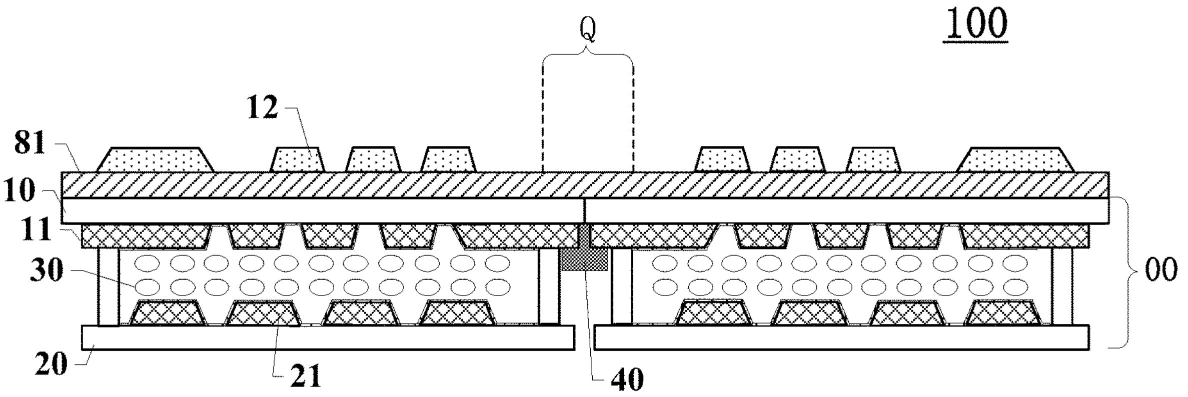
FIG. 10 illustrates a schematic diagram of another exemplary antenna consistent with disclosed embodiments of the present disclosure.

FIG. 10 illustrates a schematic diagram of another antenna consistent with disclosed embodiments of the present disclosure. Referring to FIG. 10, in the disclosed embodiments, a first auxiliary substrate 81 may be disposed on the side of the first substrate 10 of the sub-antenna 00 facing away from the dielectric function layer 30, and a radiator 12 may be disposed on the side of the first auxiliary substrate 81 facing away from the sub-antenna 00. After the phase of the high-frequency signal transmitted onto the phase shifter 21 of the sub-antenna 00 changes, the high-frequency signal may be ultimately coupled to the radiator 12, and the high-frequency signal may be radiated outward through the radiator 12.

Referring to FIG. 10, in one embodiment, the disclosed antenna may further include the first auxiliary substrate 81 and a plurality of radiators 12. The first auxiliary substrate 81 may be disposed on the side of the first substrates 10 of a plurality of sub-antennas facing away from the dielectric function layer 30, and the radiators 12 may be disposed on the side of the first auxiliary substrate 81 facing away from the first substrate 10. The plurality of sub-antennas 00 may correspond to the same first auxiliary substrate 81.

In one embodiment, in the disclosed antenna, the plurality of sub-antennas 00 may correspond to the same first auxiliary substrate 81. The radiators 12 of the sub-antennas 00 may be disposed on the same first auxiliary substrate 81 at once. The plurality of sub-antennas 00 may be disposed on the first auxiliary substrate 81 in the manner of attaching, to form a large-scale antenna array. Compared with the existing splicing scheme, the attaching precision may be substantially high, which may improve the relative position accuracy between the antennas, may simplify the assembly difficulty and may improve the production efficiency of the antenna.

Referring to FIG. 10, in one embodiment, the metal connector 40 may be disposed on the side of the first auxiliary substrate 81 close to the first substrate 10, and the metal connector 40 may be insulated from the radiators 12. In one embodiment, the metal connector may be disposed on the side of the first substrate 10 facing towards the dielectric function layer 30.

In one embodiment, when the plurality of sub-antennas 00 are spliced and fixed through the same auxiliary substrate, the metal connector 40 may be disposed in the spliced region Q on the side of the first auxiliary substrate 81 adjacent to the first substrate 10. Referring to FIG. 10, in the disclosed embodiments, the metal connector 40 may be disposed on the side of the first substrates 10 of the adjacent two sub-antennas 00 facing towards the dielectric function layer 30. In view of this, the plurality of sub-antennas 00 may be spliced with high precision through the same first auxiliary substrate 81, and such structure may improve the leakage of microwaves of the spliced antenna and may improve the overall radiation performance of the antenna.

Figure 11:
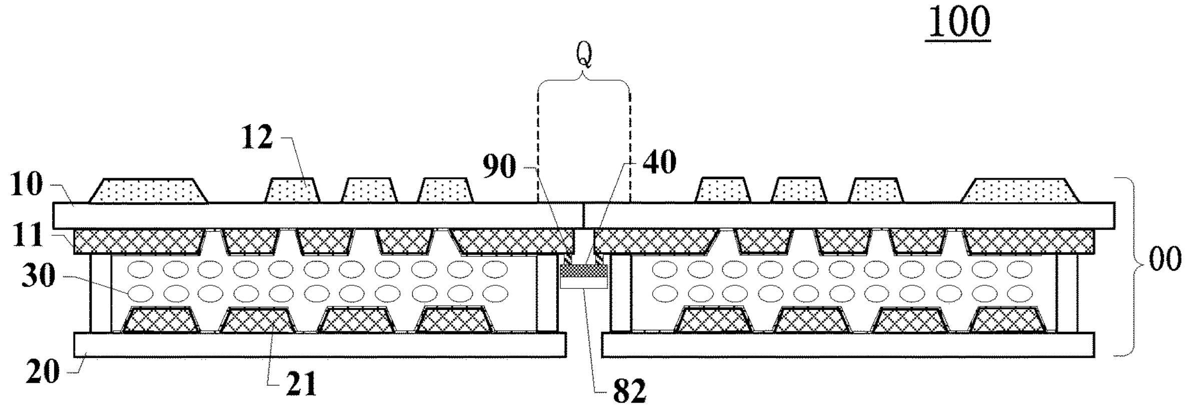
FIG. 11 illustrates a schematic diagram of another exemplary antenna consistent with disclosed embodiments of the present disclosure.
Figure 12:
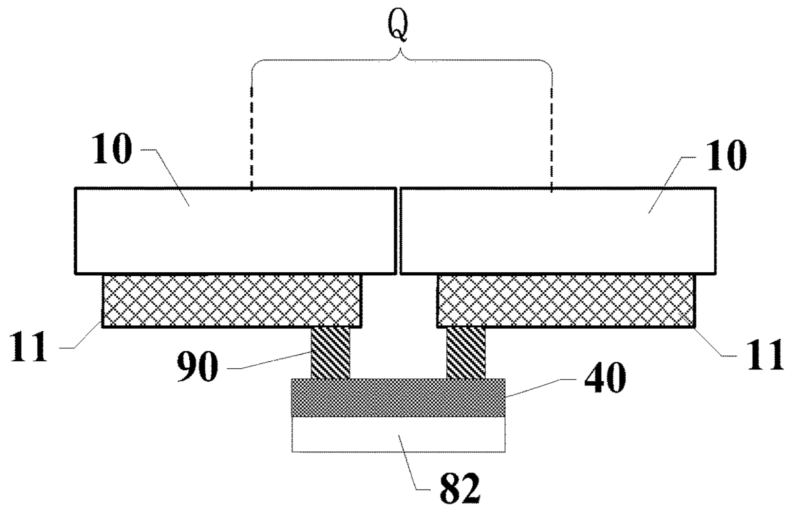
FIG. 12 illustrates a schematic diagram showing a relative positional relationship between first substrates, a second auxiliary substrate and a metal connector in the antenna in FIG. 11 consistent with disclosed embodiments of the present disclosure.
Figure 13:
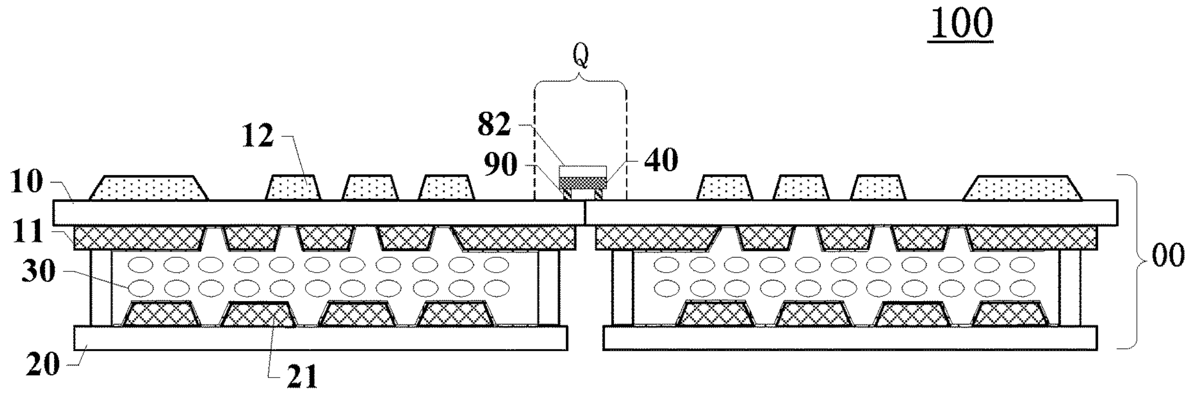
FIG. 13 illustrates a schematic diagram of another exemplary antenna consistent with disclosed embodiments of the present disclosure.
Figure 14:
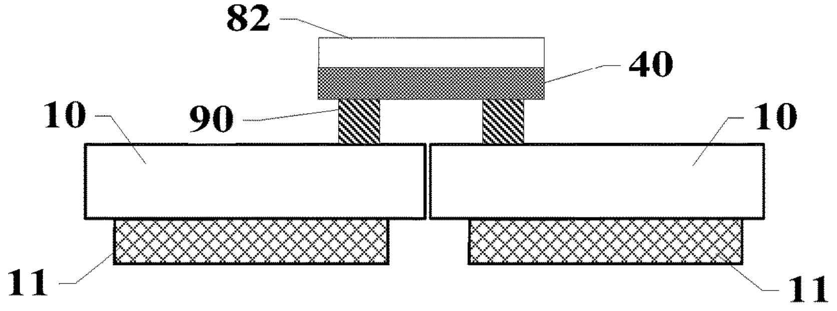
FIG. 14 illustrates a schematic diagram showing a relative positional relationship between first substrates, a second auxiliary substrate and a metal connector in the antenna in FIG. 13 consistent with disclosed embodiments of the present disclosure.

FIG. 11 illustrates a schematic diagram of another antenna consistent with disclosed embodiments of the present disclosure; and FIG. 12 illustrates a schematic diagram showing a relative positional relationship between first substrates 10, a second auxiliary substrate 82 and a metal connector 40 in the antenna in FIG. 11. FIG. 13 illustrates a schematic diagram of another antenna consistent with disclosed embodiments of the present disclosure; and FIG. 14 illustrates a schematic diagram showing a relative positional relationship between first substrates 10, a second auxiliary substrate 82 and a metal connector 40 in the antenna in FIG. 13. In the disclosed embodiments associated with FIGS. 11-14, forming a large-area antenna by splicing a plurality of sub-antennas 00 may further include a second auxiliary substrate 82.

The antenna may further include the second auxiliary substrate 82. In one embodiment, referring to FIG. 11 and FIG. 12, the second auxiliary substrate 82 may be disposed on the side of the first substrate 10 facing towards the dielectric function layer 30. In another embodiment, referring to FIG. 13 and FIG. 14, the second auxiliary substrate 82 may be disposed on the side of the first substrate 10 facing away from the dielectric function layer 30.

The metal connector 40 may be disposed on a surface of the second auxiliary substrate 82 facing towards the first substrate 10. In the spliced region Q, the metal connector 40 may be connected to adjacent two first substrates 10 through conductors 90.

In the disclosed embodiments, the metal connector 40 may be disposed on the second auxiliary substrate 82, and the metal connector 40 may be connected to the adjacent two first substrates 10 through the conductors 90, and may be electrically connected to the ground metal layers 11 on the adjacent two first substrates 10. In one embodiment, the process of forming the sub-antenna 00 may include a cutting process. For example, the phase shifter 21 and the corresponding second substrate 20 may be cut to form a film layer structure combining the substrate and the metal layer. Such structure may be fully utilized as the second auxiliary substrate 82 and the metal connector 40 in the disclosed embodiments, thereby realizing the utilization of waste material and saving production cost. In one embodiment, the conductor 90 connecting the metal connector 40 and the first substrate 10 may be made of a material including a metal paste or any other material. In one embodiment, the overall structure composed of the second auxiliary substrate 82, the metal connector 40 and the conductor 90 may form a microwave signal shielding layer, which may reduce leakage of microwaves and improve the overall radiation performance of the antenna.

Referring to FIG. 11 and FIG. 12, the second auxiliary substrate 82 and the metal connector 40 may be disposed on the side of the first substrate 10 facing towards the dielectric function layer 30. Referring to FIG. 13 and FIG. 14, the second auxiliary substrate 82 and the metal connector 40 may be disposed on the side of the first substrate 10 facing away from the dielectric function layer 30. In certain embodiments, to further prevent leakage of microwave signals, the second auxiliary substrates 82 and the metal connectors 40 may be simultaneously disposed on the side of the first substrate 10 facing towards the dielectric function layer 30 and on the side of the first substrate 10 facing away from the dielectric function layer 30.

Referring to FIG. 11 and FIG. 12, in one embodiment, the metal connector 40 may be electrically connected to the ground metal layers 11 corresponding to the adjacent two first substrates 10 through conductors 90.

In one embodiment, when the second auxiliary substrate 82 is disposed in the spliced region Q and the metal connector 40 is disposed on the second auxiliary substrate 82, the metal connector 40 and the second auxiliary substrate 82 may be disposed on the side of the first substrate 10 facing towards the dielectric function layer 30. Further, the metal connector 40 may be respectively electrically connected to the ground metal layers 11 corresponding to the adjacent two first substrates 10 through the conductors 90. In view of this, in the spliced region Q, the ground metal layers 11, the conductors 90 and the metal connector 40 may together form the signal shielding barrier, which may effectively reduce the signal attenuation caused by the microwave leakage, thereby improving the overall radiation performance of the antenna while saving the production cost.

Figure 15:
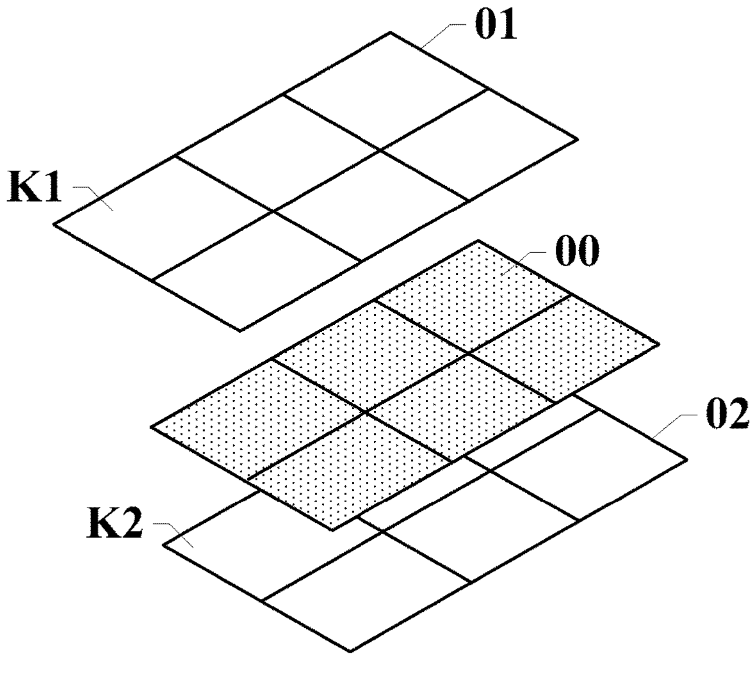
FIG. 15 illustrates a schematic diagram of spliced sub-antennas and fixing frames in an exemplary antenna consistent with disclosed embodiments of the present disclosure.

FIG. 15 illustrates a schematic diagram of spliced sub-antennas and fixing frames in an antenna consistent with disclosed embodiments of the present disclosure, which illustrates a schematic diagram of further fixing each sub-antenna 00 through the fixing frame.

Referring to FIGS. 1-15, in one embodiment, the antenna may further include a first fixing frame 01 and a second fixing frame 02 that are disposed opposite to each other. The first fixing frame 01 may include a plurality of first fixing openings K1 corresponding to the first substrates 10 of the sub-antennas 00. The first fixing frame 01 may be configured to fix each first substrate 10 in a different first fixing opening K1. The second fixing frame 02 may include a plurality of second fixing openings K2 corresponding to the second substrates 20 of the sub-antennas 00. The second fixing frame 01 may be configured to fix each second substrate 20 in a different second fixing opening K2.

In one embodiment, in the disclosed antenna, the first fixing frame 01 configured to fix the first substrates 10 of the plurality of sub-antennas 00 and the second fixing frame 02 configured to fix the second substrates 20 of the plurality of sub-antennas 00 may be provided. The first fixing frame 01 may include the plurality of first fixing openings K1, and the second fixing frame 02 may include the plurality of second fixing openings K2. Each first fixing opening K1 may fix one first substrate 10, and each second fixing opening K2 may fix one second substrate 20. In one embodiment, the first fixing opening K1 may include a hollow structure to avoid affecting the radiation performance of the antenna. In one embodiment, after the plurality of first substrates 10 and the plurality of second substrates 20 are fixed to the first fixing frame 01 and the second fixing frame 02, respectively, the first fixing frame 01 and the second fixing frame 02 may be fixed to each other. Therefore, the overall fixing reliability of the antenna with a substantially large area formed by splicing the plurality of sub-antennas 00 may be achieved.

Figure 16:
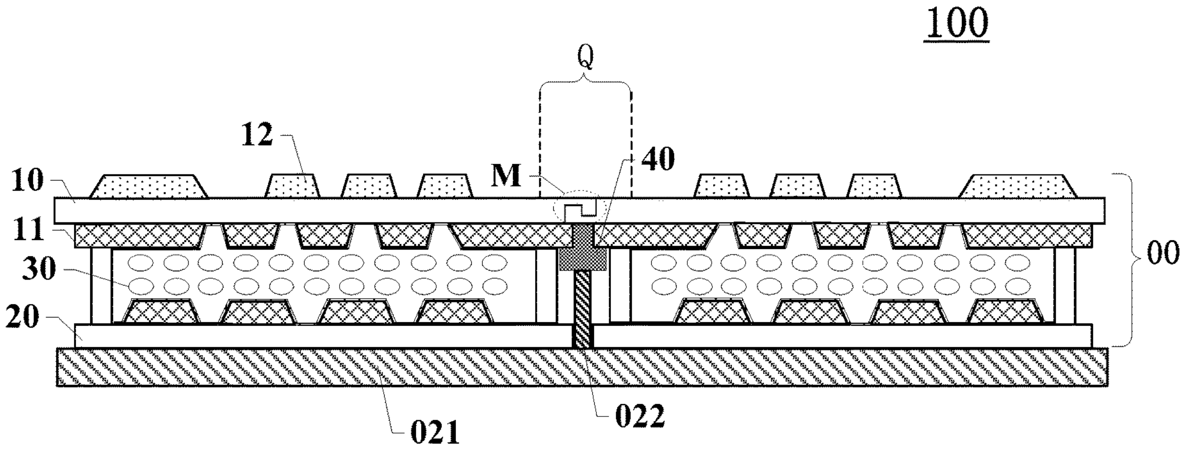
FIG. 16 illustrates a schematic diagram showing a relative positional relationship between a protrusion in a second fixing frame and adjacent two sub-antennas in an exemplary antenna consistent with disclosed embodiments of the present disclosure.

FIG. 16 illustrates a schematic diagram showing a relative positional relationship between a protrusion 022 in the second fixing frame 02 and the adjacent two sub-antennas consistent with disclosed embodiments of the present disclosure. In one embodiment, referring to FIG. 15 and FIG. 16, the second fixing frame 02 may further include the protrusion 022 and a backboard 021 disposed in the second fixing opening K2. The backboard 021 may be configured to carry the second substrate 20, and the protrusion 022 may be disposed in the first interval 61 between the adjacent two second substrates 20.

In one embodiment, in the disclosed second fixing frame 02, the backboard 021 may be disposed in the second fixing opening K2. When the second substrate 20 is fixed in the second fixing opening K2 of the second fixing frame 02, the backboard 021 may not only support the second substrate 20, but also isolate the second substrate 20 from the outside, thereby protecting the second substrate 20. In addition, the second fixing frame 02 may further include the protrusion 022. In one embodiment, the protrusion 022 may have a structure that protrudes towards the sub-antenna 00 with respect to the backboard 021. The protrusion 022 may be located in the spliced region Q, may be located in the first interval 61 between the adjacent two second substrates 20, and may extend towards the first substrate 10 to the side of the first substrate 10 facing towards the dielectric function layer 30, to support the first substrate 10 to a certain extent, which may facilitate to increase the overall splicing stability of the antenna.

It should be noted that FIG. 16 merely illustrates that the metal connector 40 may be disposed on the side of the first substrate 10 facing towards the dielectric function layer and the first substrate 10 may include the irregularly shaped surface M. The sub-antenna structures illustrated in FIGS. 1-14 may be applied to the embodiments associated with FIG. 16.

Figure 17:
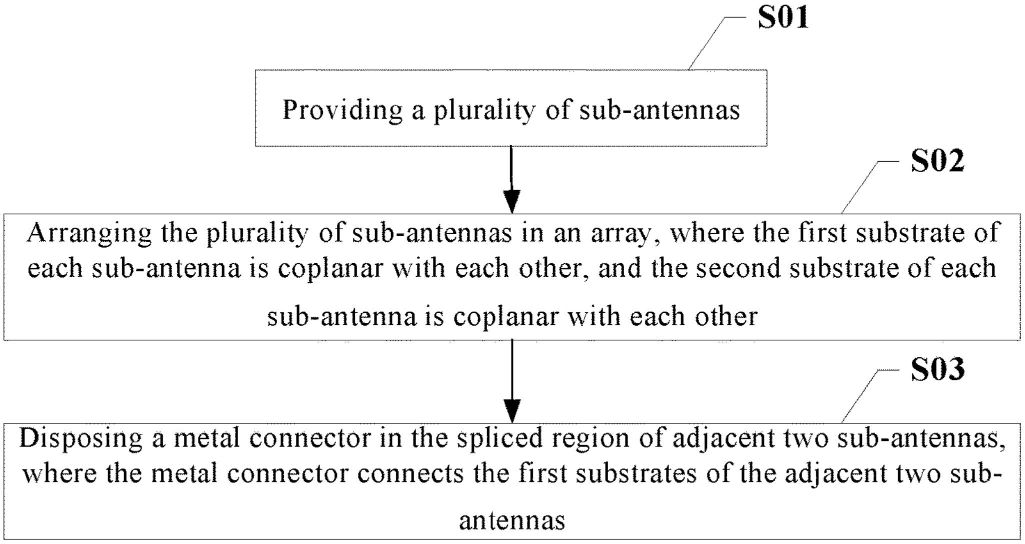
FIG. 17 illustrates a schematic flowchart of an exemplary fabrication method of an antenna consistent with disclosed embodiments of the present disclosure.

The present disclosure also provides a fabrication method of an antenna. FIG. 17 illustrates a schematic flowchart of a fabrication method of an antenna consistent with disclosed embodiments of the present disclosure. Referring to FIG. 17, the fabrication method may include following.

S01: providing a plurality of sub-antennas 00. A sub-antenna 00 may include a first substrate 10, a second substrate 20, and a dielectric function layer 30 disposed between the first substrate 10 and the second substrate 20. A ground metal layer 11 may be disposed on a side of the first substrate 10 facing towards the dielectric function layer 30.

S02: arranging the plurality of sub-antennas 00 in an array, where the first substrate 10 of each sub-antenna 00 may be coplanar with each other, and the second substrate of each sub-antenna 00 may be coplanar with each other.

S03: disposing a metal connector 40 in a spliced region Q between adjacent two sub-antennas 00, where the metal connector 40 may connect the first substrates 10 of the adjacent two sub-antennas 00.

In the disclosed fabrication method of the antenna, the plurality of sub-antennas may be spliced in an array. The first substrates 10 of the plurality of sub-antennas 00 may be coplanar with each other, and the second substrates 20 of the plurality of sub-antennas 00 may be coplanar with each other. Further, the metal connector 40 may be disposed in the spliced region Q of the adjacent two sub-antennas 00. The first substrates 10 of the adjacent two sub-antennas may be connected by the metal connector 40. In the disclosed fabrication method of the antenna, the metal connector 40 may be disposed in the spliced region Q. The metal connector 40 may have a signal shielding function, and the metal connector 40 may be simultaneously connected with the first substrates 10 of the adjacent two sub-antennas 00. Therefore, the metal connector 40 may reduce the leakage of microwaves at the gap between the adjacent two sub-antennas 00 to a certain extent, thereby facilitating to prevent or reduce signal attenuation caused by microwave leakage, and to improve the stability of microwave signal and the radiation performance of the antenna.

It should be noted that the manufacturing process of a single sub-antenna 00 may refer to the manufacturing process of sub-antenna in the related art, which may not be limited by the present disclosure.

In one embodiment, referring to FIGS. 1-17, in the above step S03, disposing the metal connector 40 in the spliced region Q of the adjacent two sub-antennas 00 may at least include following.

In the spliced region Q, a metal paste may be coated on the surfaces of the first substrates 10 of the adjacent two sub-antennas 00 facing away from or facing towards the dielectric function layer 30 by means of coating. In another embodiment, a metal foil may be pasted on the surfaces of the first substrates 10 of the adjacent two sub-antennas 00 facing away from or facing towards the dielectric function layer 30 by means of attaching.

In one embodiment, in the disclosed fabrication method of the antenna, at least two different methods may be used to dispose the metal connector 40 in the spliced region Q of the adjacent two sub-antennas 00. One of the methods may include coating, where the metal paste may be coated on the surfaces of the adjacent two first substrates 10 in the spliced region Q. For example, the metal paste may be coated on the surfaces of the adjacent two first substrates 10 facing away from the dielectric function layer 30, or may be coated on the surfaces of the adjacent two first substrates 10 facing towards the dielectric function layer 30. After the metal paste is coated, the metal paste may be cured to form the metal connector 40. The metal connector 40 may connect the adjacent two first substrates 10, and may fill the gap between the ground metal layers 11 of the adjacent two sub-antennas 00. Another one of the methods may include using the metal foil as the metal connector 40. The metal foil may be pasted on the surfaces of the adjacent two first substrates 10 facing away from the dielectric function layer 30 or may be pasted on the surfaces of the adjacent two first substrates 10 facing towards the dielectric function layer 30, which may connect the adjacent two first substrates 10 and may shield the gap between the ground metal layers 11 of the two sub-antennas 00.

When the metal connector 40 is formed by the above two methods, the metal connector 40 may shield the gap between the ground metal layers 11 corresponding to the adjacent two sub-antennas 00 to a certain extent, thereby reducing or blocking the path of microwave leakage, to reduce or avoid signal attenuation caused by leakage of microwaves and to improve the radiation performance of the antenna.

In one embodiment, when the metal paste is coated by coating, the metal paste may cover and fill the entire first gap 51 between the ground metal layers 11 of the adjacent two sub-antennas 00. When using the metal foil as the metal connector 40, a length of the metal foil may be ensured to cover the entire first gap 51 between the ground metal layers 11 of the adjacent two sub-antennas 00, to block the path of microwave leakage as much as possible.

In another embodiment, disposing the metal connector 40 in the spliced region Q of the adjacent two sub-antennas 00 may at least include following.

The antenna may be disposed on an operation console, and the first substrate 10 may be disposed on the side of the second substrate 20 facing towards the operation console. The first interval 61 may be located between the adjacent two second substrates 20.

A nozzle filled with a metal paste may be placed in the first interval 61, and the metal paste may be coated on the spliced region Q of the adjacent two sub-antennas 00 through the nozzle.

In conventional applications, the first substrate 10 may be located on an upper surface of the antenna, and the second substrate 20 may be located on a lower surface of the antenna. In one embodiment, when the metal connector 40 is disposed in the spliced region Q of the adjacent two sub-antennas 00, the spliced first substrate 10 and the second substrate 20 may be turned over, such that the second substrate 20 may be on the top, and the first substrate 10 may be on the bottom. In other words, the first substrate 10 may be placed on the operation console, and the first interval 61 between the second substrates 20 may face upward. In view of this, the nozzle filled with the metal paste may be extended to the side of the adjacent two first substrates 10 facing towards the dielectric function layer 30 through the first interval 61. The metal paste may be coated in the spliced region Q by using the nozzle. After the metal paste is cured, the metal connector 40 may be formed. In one embodiment, the metal paste may be coated at a uniform speed during the coating process, to improve the uniformity of the protrusions of the metal paste in each portion of the spliced region Q, and to ensure that each region may exert a desired signal shielding effect.

In certain embodiments, disposing the metal connector 40 in the spliced region Q of the adjacent two sub-antennas 00 may at least include following.

The antenna may be disposed on an operation console, and the first substrate 10 may be disposed on the side of the second substrate 20 facing towards the operation console. In the spliced region Q, a hollow space may be formed between the first substrate 10 and the second substrate 20, and an opening may be formed on the sides of the first substrate 10 and the second substrate 20.

The metal paste may be poured into the gap between the adjacent two first substrates 10 from the opening, and the antenna may be tilted, such that the metal paste may fill the spliced region Q.

The disclosed embodiments may provide another implementation manner of disposing the metal connector 40 in the spliced region Q of the adjacent two sub-antennas 00. In the disclosed embodiments, the metal paste may not be coated through the first interval 61 between the second substrates 20, while the metal paste may be poured from the opening on the sides of the first substrate 10 and the second substrate 20. When a certain amount of the metal paste is poured into the side of the first substrate 10 facing towards the dielectric function layer 30, a side of the antenna where the opening filled with the metal paste is located may be raised, such that the antenna overall may be inclined. Thus, the metal paste may flow along the first gap 51 between the ground metal layers 11 corresponding to the adjacent two first substrates 10 until the entire first gap 51 is fully covered. After the metal paste is cured, the metal connector 40 with a partial shielding function may be formed.

In one embodiment, in the process of forming the antenna, the first substrates of the sub-antennas may be first placed in the first fixing frame 01, respectively, as shown in Figure After splicing and fixing the first substrate of each sub-antenna through the first fixing frame and before assembling the second substrates and the second fixing frame 02, the metal connector may be disposed on the side of the first substrate facing towards the dielectric function layer, and ultimately the second substrates and the second fixing frame 02 may be fixed. In certain embodiments, the second substrates of the sub-antennas may be first placed in the second fixing frame 02, respectively, as shown in FIG. 15. After splicing and fixing the second substrate of each sub-antenna through the second fixing frame and before assembling the first substrates and the first fixing frame 01, the metal connector may be disposed on the side of the first substrate facing away from the dielectric function layer, and ultimately the first substrates and the first fixing frame 01 may be fixed.

The disclosed embodiments may have following beneficial effects. The antenna may include the plurality of sub-antennas arranged in an array. The first substrate of each sub-antenna may be coplanar with each other, and the second substrate of each sub-antenna may be coplanar with each other. In other words, the plurality of sub-antennas may be spliced to form the antenna with a substantially large area. The spliced region may be formed between the adjacent two sub-antennas. The spliced region may include the gap between the adjacent two sub-antennas and at least a portion of the region located on both sides of the gap. In the spliced region, the first substrates of the adjacent two sub-antennas may be connected by the metal connector. Through disposing the metal connector in the spliced region, the metal connector may reduce the leakage of microwaves in the spliced region to a certain extent, which may facilitate to prevent or reduce signal attenuation caused by microwave leakage, and to improve the stability of microwave signal and the radiation performance of the antenna.

In the disclosed fabrication method of the antenna, after arranging the plurality of sub-antennas in an array, the first substrate of each sub-antenna may be coplanar with each other, and the second substrate of each sub-antenna may be coplanar with each other. The metal connector may be disposed in the spliced region of the adjacent two sub-antennas, and the first substrates of the adjacent two sub-antennas may be connected by the metal connector. The metal connector may shield the microwave signal, which may avoid or reduce the leakage of microwaves from the gap between the adjacent sub-antennas. The method of merely disposing the metal connector in the spliced region to improve the radiation performance of the antenna, the manufacturing method may be simple and the operation may be easy, which may also facilitate to improve the production efficiency of the antennas.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. An antenna, comprising:
a plurality of sub-antennas arranged in an array, wherein
a sub-antenna of the plurality of sub-antennas includes:
a first substrate and a second substrate that are disposed opposite to each other,
a dielectric function layer disposed between the first substrate and the second substrate,
a ground metal layer disposed on a side of the first substrate facing towards the dielectric function layer, and
a metal connector, wherein:
the first substrate of each sub-antenna is coplanar with each other, and the second substrate of each sub-antenna is coplanar with each other, and
a spliced region is formed between adjacent two sub-antennas of the plurality of sub-antennas, and in the spliced region, two first substrates of the adjacent two sub-antennas are connected by the metal connector.

2. The antenna according to claim 1, wherein:
in the spliced region, a first gap is formed between ground metal layers of the adjacent two sub-antennas, wherein along a direction perpendicular to the first substrate, the metal connector covers the first gap.

3. The antenna according to claim 1, wherein:
the metal connector is located over a surface of the first substrate facing away from the dielectric function layer, and/or
the metal connector is located over a surface of the first substrate facing towards the dielectric function layer.

4. The antenna according to claim 1, wherein:
the metal connector is located over a surface of the first substrate facing towards the dielectric function layer, and the metal connector is in contact with ground metal layers corresponding to the adjacent two first substrates, respectively.

5. The antenna according to claim 1, wherein:
a first interval is formed between second substrates of the adjacent two sub-antennas.

6. The antenna according to claim 5, wherein:
a width of the first interval is in a range of approximately 0.1 mm-1 mm.

7. The antenna according to claim 1, wherein:
in the spliced region, each of the two first substrates of the adjacent two sub-antennas includes an irregularly shaped surface, and two irregularly shaped surfaces of the two first substrates are nested.

8. The antenna according to claim 7, wherein:
each of the two irregularly shaped surfaces of the two first substrates of the adjacent two sub-antennas includes an L-shape.

9. The antenna according to claim 7, wherein:
a metal layer is formed between the two irregularly shaped surfaces, and the metal layer is electrically connected to the metal connector.

10. The antenna according to claim 1, wherein:
the metal connector is formed by curing a metal paste, or the metal connector includes a metal foil.

11. The antenna according to claim 1, wherein:
the metal connector is made of a material including at least one of silver, copper, aluminum and gold.

12. The antenna according to claim 1, wherein:
along a direction perpendicular to the first substrate, a thickness of the metal connector is greater than or equal to a thickness of the ground metal layer.

13. The antenna according to claim 1, further including:
a first auxiliary substrate and a plurality of radiators, wherein:
the first auxiliary substrate is disposed on a side of first substrates of the plurality of sub-antennas facing away from the dielectric function layer,
the plurality of radiators are disposed on a side of the first auxiliary substrate facing away from the first substrates, and
the plurality of sub-antennas correspond to the same first auxiliary substrate.

14. The antenna according to claim 13, wherein:
the metal connector is disposed on a side of the first auxiliary substrate close to the first substrates, and the metal connector is insulated from the plurality of radiators.

15. The antenna according to claim 1, further including:
a second auxiliary substrate, wherein:
the second auxiliary substrate is disposed on the side of the first substrate facing towards the dielectric function layer, or the second auxiliary substrate is disposed on a side of the first substrate facing away from the dielectric function layer,
the metal connector is disposed on a surface of the second auxiliary substrate facing towards the first substrate, and
in the spliced region, the metal connector is connected to the adjacent two first substrates through conductors.

16. The antenna according to claim 15, wherein:
the conductors are electrically connected to ground metal layers corresponding to the adjacent two first substrates.

17. The antenna according to claim 1, further including:
a first fixing frame and a second fixing frame that are disposed opposite to each other, wherein:
the first fixing frame includes a plurality of first fixing openings corresponding to first substrates of the plurality of sub-antennas, and the first fixing frame is configured to fix each first substrate in a different first fixing opening of the plurality of first fixing openings, and
the second fixing frame includes a plurality of second fixing openings corresponding to second substrates of the plurality of sub-antennas, and the second fixing frame is configured to fix each second substrate in a different second fixing opening of the plurality of second fixing openings.

18. The antenna according to claim 17, wherein:

the second fixing frame further includes a protrusion and a backboard disposed in a second fixing opening of the plurality of second fixing openings, wherein the backboard is configured to carry the second substrate, and the protrusion is disposed in a first interval between adjacent two second substrates.

19. A fabrication method of an antenna, comprising:

providing a plurality of sub-antennas, wherein:

a sub-antenna of the plurality of sub-antennas includes a first substrate and a second substrate that are disposed opposite to each other, a dielectric function layer disposed between the first substrate and the second substrate, and a ground metal layer disposed on a side of the first substrate facing towards the dielectric function layer;

arranging the plurality of sub-antennas in an array, wherein the first substrate of each sub-antenna is coplanar with each other, and the second substrate of each sub-antenna is coplanar with each other; and disposing a metal connector in a spliced region of adjacent two sub-antennas of the plurality of sub-antennas, wherein the metal connector connects first substrates of the adjacent two sub-antennas.

20. The fabrication method according to claim 19, wherein disposing the metal connector in the spliced region of the adjacent two sub-antennas at least includes:

in the spliced region, coating a metal paste on surfaces of the first substrates of the adjacent two sub-antennas facing away from or facing towards the dielectric function layer; or in the spliced region, pasting a metal foil on the surfaces of the first substrates of the adjacent two sub-antennas facing away from or facing towards the dielectric function layer; or disposing the antenna on an operation console, and disposing the first substrate on a side of the second substrate facing towards the operation console, wherein a first interval is formed between adjacent two second substrates, and placing a nozzle filled with a metal paste in the first interval, and coating the metal paste on the spliced region of the adjacent two sub-antennas through the nozzle; or disposing the antenna on an operation console, and disposing the first substrate on a side of the second substrate facing towards the operation console, wherein in the spliced region, a hollow space is formed between the first substrate and the second substrate, and an opening is formed by sides of the first substrate and the second substrate, and pouring a metal paste into the opening to fill a gap between the adjacent two first substrates, and tilting the antenna to make the metal paste fill the spliced region.

* * * * *